United States Patent
Saxena (10) Patent No.: US 9,866,613 B2
(45) Date of Patent: Jan. 9, 2018

(54) SDK FOR PROVIDING CONTENT TO USERS WITHOUT CHARGING FOR DATA TRANSMISSION

(71) Applicant: Verizon Patent and Licensing Inc., Arlington, VA (US)

(72) Inventor: Samiksha Saxena, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 304 days.

(21) Appl. No.: 14/667,197

(22) Filed: Mar. 24, 2015

(65) Prior Publication Data

US 2016/0285947 A1    Sep. 29, 2016

(51) Int. Cl.
*H04L 29/08* (2006.01)
*H04L 29/06* (2006.01)
*G06F 17/30* (2006.01)

(52) U.S. Cl.
CPC ........ *H04L 67/02* (2013.01); *G06F 17/30876* (2013.01); *H04L 63/10* (2013.01); *H04L 63/108* (2013.01); *H04L 67/146* (2013.01); *H04L 67/20* (2013.01)

(58) Field of Classification Search
CPC .. H06W 76/00; G06F 17/30876; H04L 67/02; H04L 67/20; H04L 67/14; H04L 67/141; H04L 67/143; H04L 67/145; H04L 67/146; H04L 63/0236; H04L 63/0245; H04L 63/10; H04L 63/108
See application file for complete search history.

(56) References Cited

U.S. PATENT DOCUMENTS

| | | | | |
|---|---|---|---|---|
| 7,222,088 B2* | 5/2007 | Nishikado | ............. | H04L 63/104 705/26.1 |
| 7,873,734 B1* | 1/2011 | Eidelman | ............. | H04L 67/142 709/203 |
| 8,108,776 B2* | 1/2012 | Gopalakrishnan | ......................... | G06F 17/30058 707/705 |
| 9,020,854 B2* | 4/2015 | Giobbi | ................ | H04L 63/0428 705/51 |
| 9,032,480 B2* | 5/2015 | Mindler | .............. | H04L 61/3075 726/3 |
| 2002/0147929 A1* | 10/2002 | Rose | ................... | H04L 63/0807 726/10 |
| 2003/0084098 A1* | 5/2003 | Lavin | ...................... | H04L 61/30 709/203 |
| 2005/0044243 A1* | 2/2005 | Narayanan | ............. | H04L 67/14 709/229 |
| 2012/0124372 A1* | 5/2012 | Dilley | ................. | H04L 67/2819 713/162 |

(Continued)

*Primary Examiner* — Patrice Winder (57) ABSTRACT

Techniques described herein may provide a software development kit ("SDK") for third party content providers (e.g., content providers external to a wireless telecommunications network) to provide toll-free content to users. Specifically, the transmission of such toll-free content, via the wireless telecommunications network, may not incur data charges to the user. Content providers may register content as being toll-free, and may include a script in web pages that link to the toll-free content. User devices may execute the script in order to validate links to toll-free content. User devices may further provide notifications that indicate that particular content is toll-free content.

20 Claims, 9 Drawing Sheets

(56) References Cited

U.S. PATENT DOCUMENTS

| | | | |
|---|---|---|---|
| 2012/0304045 A1* | 11/2012 | Bulleit | G06Q 30/02 715/205 |
| 2014/0120867 A1* | 5/2014 | Hodges | G06Q 30/00 455/406 |
| 2014/0325627 A1* | 10/2014 | Fee | H04L 63/0807 726/7 |
| 2016/0021064 A1* | 1/2016 | Lock | H04L 63/0428 726/26 |

* cited by examiner

SDK FOR PROVIDING CONTENT TO USERS WITHOUT CHARGING FOR DATA TRANSMISSION

BACKGROUND

Content providers often provide content, such as streaming content (e.g., streaming video content, streaming audio content, etc.), file transfer content, web content, and/or other types of content, to users. Accessing content can be data-intensive, and users may sometimes be discouraged from accessing content, due to the amount of data required to access the content. For example, if a user wishes to access streaming video content while using a mobile telephone that receives data via a cellular network, the user may refrain from doing so, in order to avoid potentially costly data charges.

DETAILED DESCRIPTION OF PREFERRED EMBODIMENTS

The following detailed description refers to the accompanying drawings. The same reference numbers in different drawings may identify the same or similar elements.

Implementations, describe herein, may provide for content (e.g., streaming video content, streaming audio content, etc.) to be provided to users in a "toll-free" manner (e.g., without charging the recipient for the transmission of the content). For example, users of cellular telephones may not be billed for data usage for the transmission of toll-free content to the users' cellular telephones.

In some implementations, a software development kit ("SDK") may be provided, that allows content providers to specify content that should be provided in a toll-free manner. Thus, in accordance with implementations described herein, a third party (e.g., a party external to a wireless telecommunications provider) may be allowed to specify, to the wireless telecommunications provider, content for which data transmission charges should not be assessed to users. In some implementations, content providers may form an agreement regarding limits on amounts of toll-free content that can be provided to users. The agreement may comprise a subscription-based agreement, an agreement whereby the content provider is directly charged for the data transmission (in lieu of the user being charged), and/or some other sort of arrangement. As described in greater detail below, the SDK may include a script-based implementation (e.g., a JavaScript implementation). The script-based implementation may include a script that replaces resource identifiers (e.g., resource identifiers associated with "links," such as Uniform Resource Locators ("URLs")) of toll-free content with different resource identifiers, which the wireless telecommunication network may use to avoid charging the recipient of toll-free content for the data transmission.

Figure 1A:
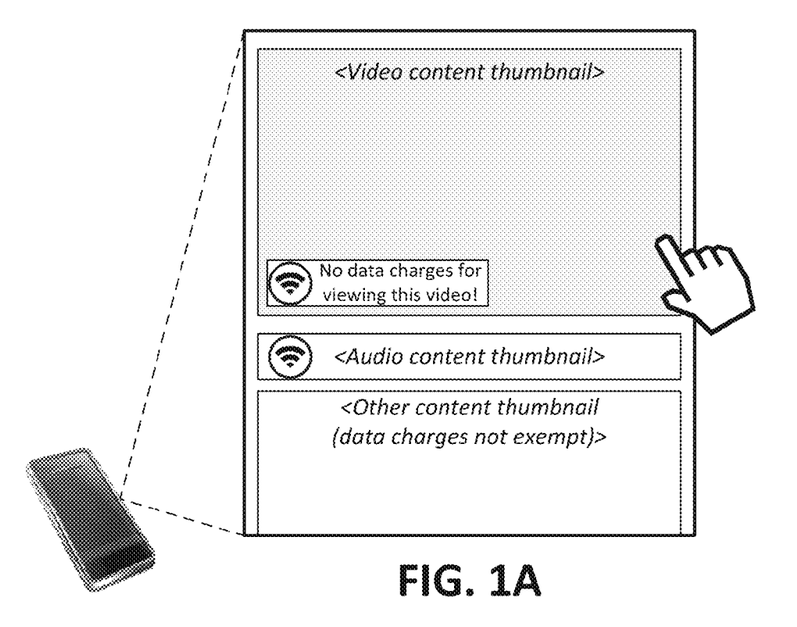
FIGS. 1A and 1B illustrate an example overview of implementations described herein, in which a user may be presented with toll-free content (e.g., content for which data transmission charges may not apply)

As shown in FIG. 1A, a user device (e.g., a mobile telephone) may display a page (e.g., a web page), on which various thumbnails are presented. These thumbnails may be, for example, images which, when selected, link to other pages (e.g., content presentation pages, on which corresponding content may be presented). For example, as shown, the page may include a video content thumbnail, an audio content thumbnail, and another content thumbnail. As further shown, the thumbnails for the video content and the audio content may include notifications that data charges will not apply for the content (referred to herein as "pre-notifications"). For instance, the pre-notifications may include an icon and/or text ("No data charges for viewing this video!", in this example). Such a pre-notification may be absent for content for which normal data charges apply (i.e., the thumbnail for the other content may not include such a pre-notification). As described in greater detail below, the pre-notifications may be displayed based on a validation operation when the page is loaded by the user device, in which the corresponding content is validated as being toll-free content.

Figure 1B:
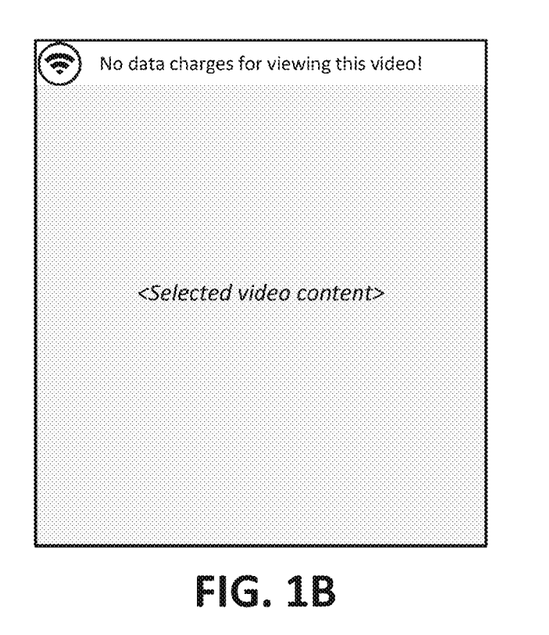

Assume, for example, that a user of the user device selects the video content thumbnail. As shown in FIG. 1B, a content presentation page may be presented on the user device, in which the selected video content is played. As also shown, a notification may be provided, indicating that the user is not being charged for data usage associated with the video content ("No data charges for viewing this video!").

Figure 2:
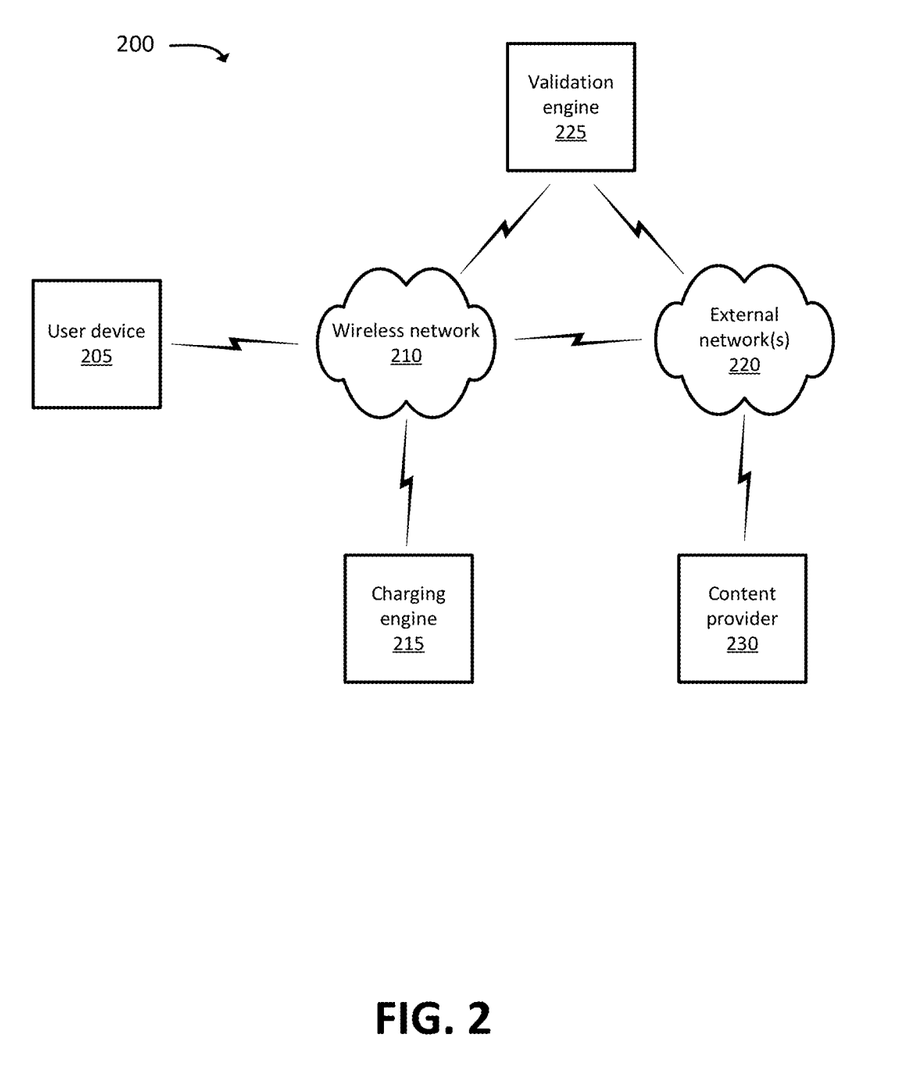
FIG. 2 illustrates an example environment, in which systems and/or methods, described herein, may be implemented.

FIG. 2 illustrates an example environment 200, in which systems and/or methods described herein may be implemented. As shown in FIG. 2, environment 200 may include user device 205, wireless network 210, charging engine 215, external network 220, validation engine 225, and content provider 230.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

User device 205 may include any computation and communication device that is capable of communicating with one or more networks (e.g., wireless network 210 and/or external network 220). For example, user device 205 may include a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a television, a set-top device ("STD"), a personal gaming system, a wearable device, and/or another type of computation and communication device. User device 205 may include logic and/or hardware circuitry to communicate via one or more "short range" wireless protocols, such as Bluetooth Low Energey ("BLE"), Near Field Communications ("NFC"), Wi-Fi (e.g., based on an Institute of Electrical and Electronics Engineers Institute of Electrical and Electronics Engineers ("IEEE") 802.11-based standard), ZigBee (e.g., based on an IEEE 802.15.4-based standard), or the like.

Wireless network 210 may include one or more networks, via which one or more devices, shown in FIG. 2, may communicate. For example, wireless network 210 may include an evolved packet system ("EPS") that includes a Long Term Evolution ("LTE") network and/or an evolved packet core ("EPC") network that operate based on a Third Generation Partnership Project ("3GPP") wireless communication standard. The LTE network may be, or may include, a radio access network ("RAN") that includes one or more base stations, some or all of which may take the form of an eNodeB ("eNB"), via which user device 205 and/or another device may communicate with the EPC network. The EPC network may include one or more serving gateways ("SGWs"), mobility management entities ("MMEs"), and/or packet data network ("PDN") gateways ("PGWs"), and may enable user device 205 to communicate with one or more other networks (e.g., external network 220) and/or an IP Multimedia Subsystem ("IMS") core network (not pictured). The IMS core network may manage authentication, session initiation, account information, a user profile, etc. associated with user device 205 and/or customer device 210.

The transmission of data to and/or from user device 205, via wireless network 210, may be tracked by an owner or operator of wireless network 210 (e.g., a wireless "carrier"). A subscriber, associated with user device 205, may typically be billed for data usage (or data usage may count against the subscriber's maximum allotment of data usage) for data transmitted to and/or from user device 205, via wireless network 210. Wireless network 210 may include, or communicate with, charging engine 215, and/or another device that tracks the data usage of wireless network 210. Charging engine 215 may include, may be integrated as part of, and/or may be in communication with a Policy Charging and Rules Function ("PCRF"), a Home Subscriber Server ("HSS"), an Authentication, Authorization, and Accounting ("AAA") server, a PGW, and/or another device associated with wireless network 210. In some implementations, charging engine 215 may detect the transmission of toll-free content, and may forgo charging a user for data usage associated with the transmission of the toll-free content via wireless network 210. In some implementations, charging engine 215 may track toll-free content, associated with a particular content provider 230, and may charge content provider 230 for the data usage (and/or may count the data usage against a maximum amount of data allotted to content provider 230).

External network(s) 220 may include one or more packet data networks ("PDNs"), such as the Internet, a metropolitan area network ("MAN"), a local area network ("LAN"), a wide area network ("WAN"), a private enterprise network, etc. External network(s) 220 may be "external" to wireless network 210, in the sense that data transmission to and/or from user device 205, via external network 220, may not be tracked and/or charged by a carrier associated with wireless network 210.

Validation engine 225 may include one or more devices (e.g., a server device or a collection of server devices) that register content as being toll-free, and subsequently validate whether requested content is toll-free content. For example, as described in further detail below, content provider 230 may register content (e.g., by providing a URL associated with content) as toll-free, and may establish other parameters (e.g., an amount of data that should be provided toll-free, a quantity of times the content may be provided toll-free, etc.). Validation engine 225 may receive requests (e.g., from user device 205) to validate whether content is toll-free, and may, in some implementations, provide modified URLs when validating content as toll-free content. The modified URLs may include parameters (e.g., query strings), which may cause charging engine 215 not to charge a subscriber, associated with user device 205, for transmission of the toll-free content.

Content provider 230 may include one or more devices (e.g., a server device or a collection of server devices) that provide content (e.g., streaming video content, streaming audio content, web content such as web pages, etc.). In some implementations, content provider 230 may be owned and/or operated by an entity that registers content, hosted by content provider 230, as toll-free content. Content, hosted by content provider 230, may be accessible to user device 205 via a URL and/or another type of resource identifier (e.g., a Uniform Resource Identifier ("URI"), an Internet Protocol ("IP") address, etc.). Content provider 230 may, in some implementations, include logic and/or hardware circuitry to programmatically generate pages (e.g., web pages) associated with toll-free content. In some implementations, content provider 230 may receive web pages and/or scripts, associated with toll-free content, from a developer.

Figure 3:
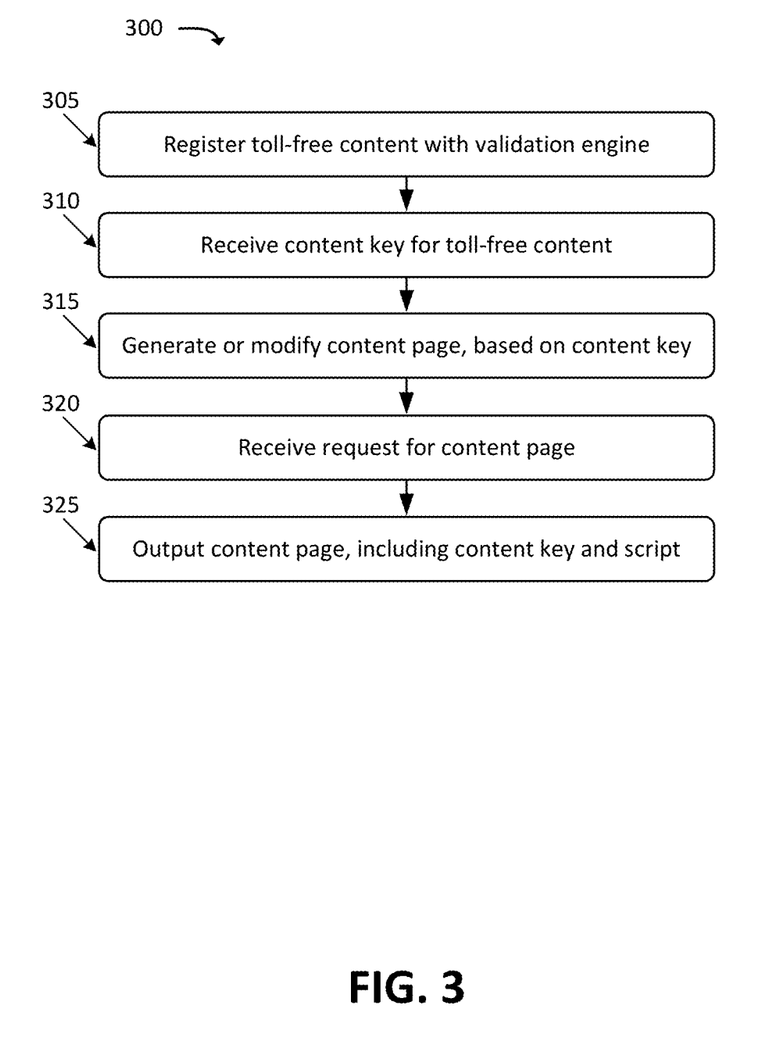
FIG. 3 illustrates an example process for registering toll-free content, and for outputting a content page that allows a user to access the toll-free content.

FIG. 3 illustrates a flowchart of an example process 300 for registering toll-free content, and for outputting a content page that allows a user to access the toll-free content. In some implementations, process 300 may be performed by content provider 230. In other implementations, some or all of process 300 may be performed by one or more other devices in addition to, or in lieu of, content provider 230.

As shown, process 300 may include registering (at 305) toll-free content with a validation engine. For example, content provider 230 may include an implementation of an SDK, which may have the capability of communicating with validation engine 225. For example, a resource identifier (e.g., a URL) of validation engine 225 may be "hard-coded" into the SDK, and a user associated with content provider 230 may indicate content that should be registered with validation engine 225. For instance, one or more URLs may be identified as corresponding to toll-free content, which should be registered with validation engine 225. A particular URL may correspond to streaming video content, streaming audio content, a web page, and/or other types of content. In some implementations, the URL may be specified as a regular expression. For example, the regular expression "foo.com/*" may indicate that any URL that begins with "foo.com/" should be registered as toll-free content.

In some implementations, the registration process may include specifying data usage limits, subscription fees and terms, and/or other parameters associated with charging content provider 230 for transmission of toll-free content. That is, while a user of user device 205 may not be charged for toll-free content, content provider 230 may instead be charged. For example, content provider 230 may specify a maximum amount of data (e.g., in terms of gigabytes ("GB"), terrabytes ("TB"), etc.) that can be transmitted in a toll-free fashion. As another example, content provider 230 may specify that content is to be provided toll-free only during certain times of the day, days of the week, etc. As yet another example, content provider 230 may specify a maximum quantity of times a particular content item (e.g., on a per-URL basis) may be transmitted in a toll-free fashion. As a further example, content provider 230 may participate in a subscription-based service, where content is transmitted in a toll-free fashion for as long as the subscription is active. As another example, content provider 230 may specify a maximum quantity of times that a particular user or user device 205 may access particular content in a toll-free fashion (e.g., a user may only view a video toll-free once). The registration process may, in some implementations, be performed via a web portal (e.g., as hosted by validation engine 225 and/or another device), via an application running on content provider 230, and/or via some other methodology.

Process 300 may also include receiving (at 310) a content key for the toll-free content. For example, validation engine 225 may complete the registration process (which may include authenticating content provider 230, collecting payment information, verifying that the URL(s) are not "dead links," and/or other similar functions), and may generate a unique key (referred to herein as a "content key") for the content. As described below, the key may be used, by validation engine 225, to verify whether content is valid toll-free content.

Process 300 may further include generating or modifying (at 315), based on the content key, a content page associated with the toll-free content. For example, content provider 230 may insert the content key in one or more content pages (e.g., web pages) that include a URL of toll-free content. For instance, assume that desired toll-free content is located at the URL "foo.com/bar.html", and that a particular content page includes a link, having the HyperText Markup Language ("HTML") code "<a href="foo.com/bar.html">". Content provider 230 (or a user associated with content provider 230) may modify the HTML code to include the content key. For example, the HTML code may be modified to "<a href="foo.com/bar.html" class="1234567890">", where "1234567890" is the content key provided by validation engine 225, in this example.

In some implementations, content provider 230 may insert HTML code that corresponds to a script (e.g., JavaScript). As described below, the script may cause a device that accesses the content page (e.g., user device 205) to contact validation engine 225 to validate the content as being toll-free content. For example, content provider 230 may insert the following example HTML code into a <head> section of the content page: "<script type="text/javascript" src="http://validationServer.com/validate.js"></script>" (where "http://validationServer.com/validate.js" is a resource identifier associated with a script that allows content to be validated as toll-free content). The content page (generated and/or modified at 315) may be stored (e.g., hosted) by content provider 230 and/or another device.

In some implementations, the script may specify device types, browser types, and/or other information, to which some or all of the instructions, associated with the script, apply. For example, the script may indicate that desktop computers, laptop computers, gaming systems, etc. (and/or browsers that typically run on such types of devices) should not execute some of the instructions associated with the script (e.g., requesting validation of toll-free content). As another example, the script may indicate that mobile phones (and/or browsers that typically run on mobile phones) should execute some or all of the instructions associated with the script (e.g., requesting validation of toll-free content).

Process 300 may additionally include receiving (at 320) a request for the content page. For example, user device 205 may request the content page (generated or modified at 315), based on accessing (or "browsing to") a URL associated with the content page. Process 300 may further include outputting (at 325) the content page, including the content key and the script (e.g., the URL associated with the script). As described below, user device 205 may execute the script in order to verify particular content as toll-free content, which may include providing the URL and content key to validation engine 225.

Figure 4:
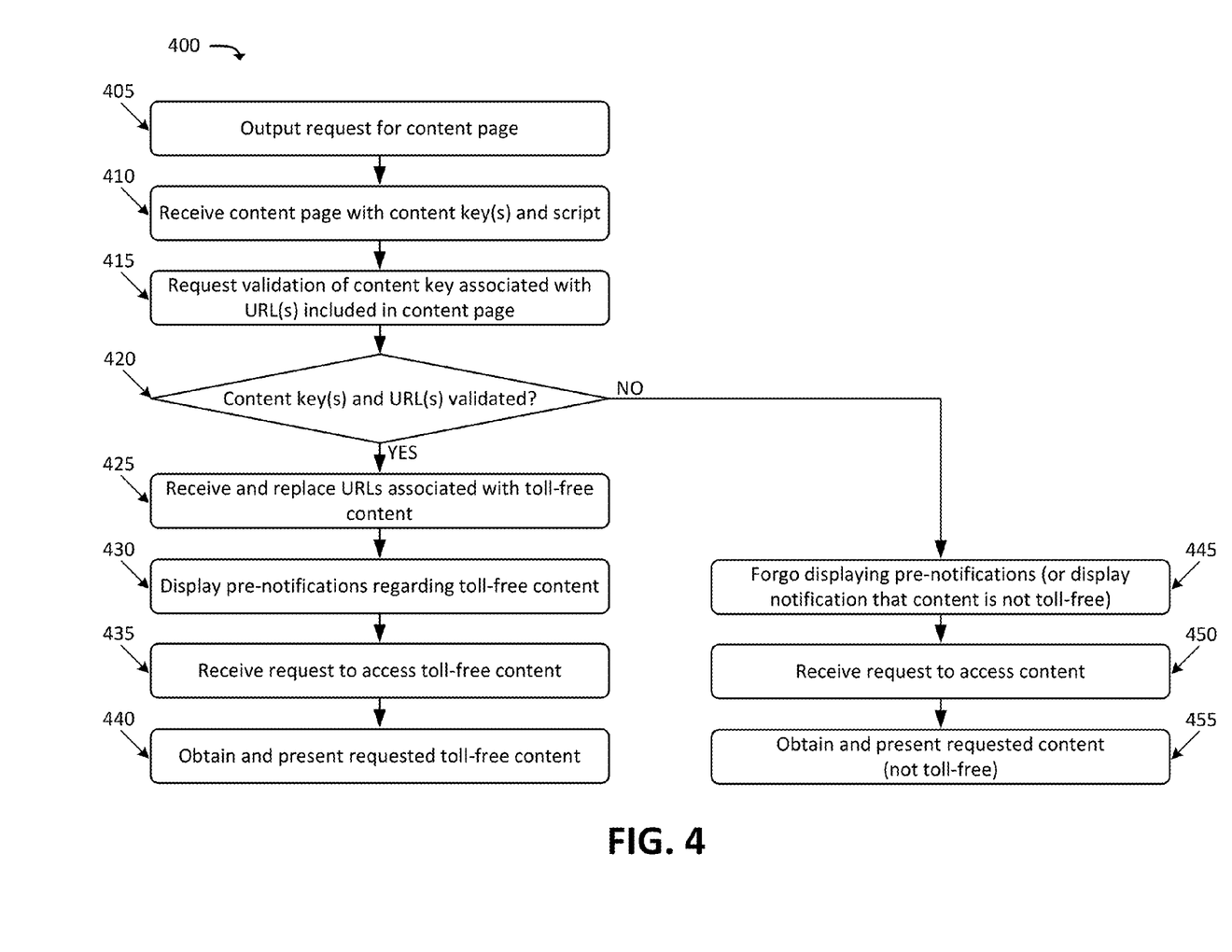
FIG. 4 illustrates an example process for accessing toll-free content based on a script included in a content page provided by a content provider.

FIG. 4 illustrates a flowchart of an example process 400 for accessing toll-free content based on a script included in a content page provided by a content provider. In some implementations, process 400 may be performed by user device 205. In other implementations, some or all of process 400 may be performed by one or more other devices in addition to, or in lieu of, user device 205.

As shown, process 400 may include outputting (at 405) a request for a content page. For example, a user of user device 205 may enter a URL, corresponding to the content page, into a browser application, may navigate to a URL that corresponds to the content page (e.g., may "click" a link), etc. As another example, an application, other than a web browsing application, running on user device 205 may output the request for the content page.

Process 400 may also include receiving (at 410) the requested content page, which may include one or more content keys and a script. For example, content provider 230 (or another device that hosts the content page) may output the content page (e.g., via HyperText Transfer Protocol ("HTTP")) to user device 205. The content page may include toll-free content, may have been previously registered with validation engine 225, and may include one or more content keys (e.g., as described above with respect to process 300). The content page may also include a script, and/or a link to a script (e.g., a URL that references JavaScript code). User device 205 may execute the script, in order to perform one or more of the following operations (e.g., one or more of operations 415, 425, 430, and/or 445).

Process 400 may further include requesting (at 415) validation of one or more content keys associated with one or more URLs included in the content page. For example, user device 205 (e.g., by executing the script included in the content page) may communicate with validation engine 225, in order to validate one or more of the content key-URL pairs in the content page. For example, user device 205 may identify each URL that is associated with a content key (e.g., a link having the format "<a href="foo.com/bar.html" class="1234567890">", where "foo.com/bar.html" is an example URL and "1234567890" is an example content key associated with the example URL), and may provide the content key-URL pair to validation engine 225.

As another example, the content page may indicate, in another fashion, which URL(s) are associated with a content key (e.g., are links to toll-free content). For instance, a <head> section of the content page may include a content key, which may indicate that all URLs in the content page are links to toll-free content. In this situation, user device 205 may output the content key and the URL of the content page itself to validation engine 225 for validation.

As yet another example, distinct sections (e.g., as denoted by an HTML <section> tag or as denoted in some other way) of the content page may include links to toll-free content, while other sections may not. Such sections may be denoted, for instance, in the following format: <section class="1234567890">", where "1234567890" is an example content key associated with the corresponding section). In some implementations, different sections may be associated with different content keys, and may be validated (e.g., by validation engine 225) separately. In this situation also, user device 205 may output the content key and the URL of the content page itself to validation engine 225 for validation.

If the content key(s) and URL(s) are validated (420—YES), then process 400 may include receiving and replacing (at 425) URLs, associated with toll-free content. For example, as described further below with respect to FIG. 5, validation engine 225 may validate content key-URL pairs, in order to verify whether the URL(s) is/are actually associated with toll-free content. User device 205 may provide multiple content key-URL pairs to validation engine 225 for validation, in situations where multiple content key-URL pairs are present in the content page, and validation engine 225 may validate each pair separately. In some situations, some content may be validated as content-free, while other content may not be validated.

When toll-free content is validated by validation engine 225, validation engine 225 may provide replacement URLs for the validated URLs. For example, assume that the URL "foo.com/bar.html" was validated by validation engine 225. Validation engine 225 may provide a replacement URL, which may be a modified version of the original URL, such as "foo.com:1234/bar.html?param1=abc&param2=def". As may be apparent, the replacement URL may include a port number ("1234") and/or one or more query strings ("param1=abc" and "param2=def"). One or more devices in wireless network 210 (e.g., charging engine 215, a PGW, and/or one or more other devices) may use the additional information (e.g., the port number and/or the query strings) to identify the linked content as toll-free content, and my forgo charging the user for the transmission of the content (and/or may charge content provider 230 for the transmission of the content). User device 205 may modify the link in the page, based on the received replacement URL (e.g., may replace the link "<a href="foo.com/bar.html" class="1234567890">" with the link "<a href="foo.com:1234/bar.html?param1=abc&param2=def">").

In some implementations, instead of replacing a link with a new or modified link base on a URL provided by validation engine 225, user device 205 may include the original link in addition to the new or modified link. This may be useful in situations where user device 205 is not connected to wireless network 210, and/or is receiving data from another network. For instance, user device 205 may be connected to a Wi-Fi network, and may not be charged for data regardless of whether selecting the original link or the new link.

Process 400 may also include displaying (at 430) a pre-notification regarding toll-free content. For example, as described in further detail below, the content page may include cascading style sheet ("CSS") information, based on which a pre-notification (e.g., an image and/or text indicating that linked content is toll-free content) may be presented on the page in a conditional manner. For example, when validation engine 225 provides a new or modified URL, the pre-notification may be displayed (e.g., overlaid on top of a thumbnail image associated with the URL). The CSS information may also specify a display area, in which the pre-notification may be presented. For example, the CSS information may specify that the pre-notification may be presented in the top left, the top right, the bottom left, the bottom right, or at another portion of a thumbnail image.

Process 400 may additionally include receiving (at 435) a request to access particular toll-free content. For example, a user of user device 205 may select a link (i.e., a new or modified link, provided by validation engine 225) that corresponds to toll-free content.

Process 400 may further include obtaining and presenting (at 440) the requested toll-free content. For instance, user device 205 may access the URL associated with the new or modified link. As described below, one or more components of wireless network 210 (e.g., charging engine 215) may ensure that the linked content is provided to user device 205 in a toll-free manner. As also described below, a notification may be provided, during presentation of the content, that the content is being provided without charging the subscriber for the transmission of the data.

If, on the other hand, the content key(s) and/or the URL(s) are not validated (420—NO), then process 400 may include forgoing (at 445) displaying pre-notifications, or displaying a notification that content is not toll-free. For example, user device 205 may display a thumbnail image normally, without including the pre-notification described above with respect to block 430. In some implementations, user device 205 may display a notification indicating that the linked content is not toll-free. For example, user device 205 may use CSS information to determine where in the page to provide the notification (e.g., overlaid on top of a thumbnail image associated with a link to content that is not toll-free).

Process 400 may further include receiving (at 450) a request to access content (e.g., content that is not toll-free). For example, a user of user device 205 may select a link that corresponds to content that is not toll-free. Process 400 may additionally include obtaining and presenting (at 455) the requested content, which is not toll-free. In some implementations, user device 205 may be charged for the data transmission (via wireless network 210) as normal.

Figure 5:
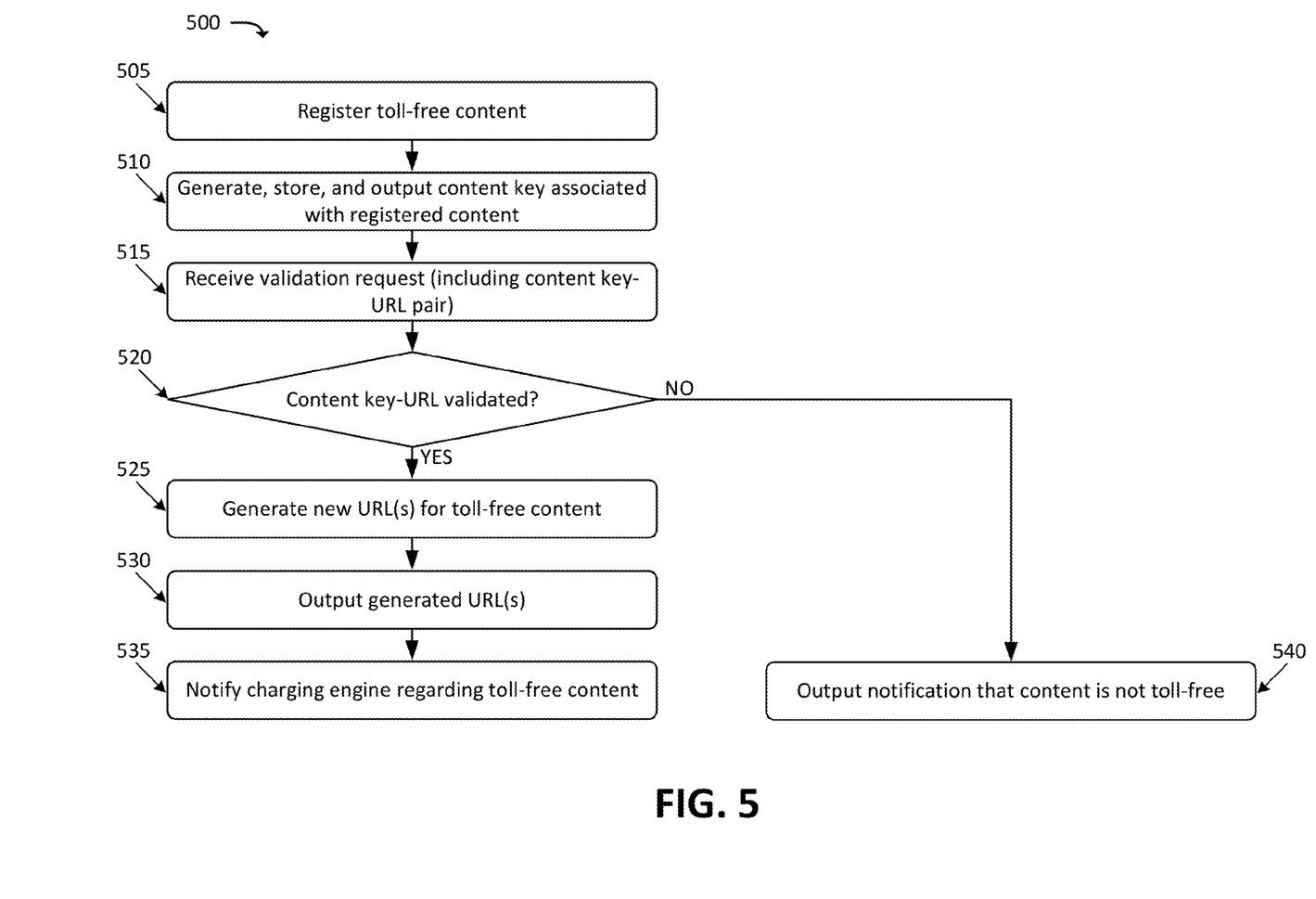
FIG. 5 illustrates an example process for validating toll-free content.

FIG. 5 illustrates an example process for validating toll-free content. In some implementations, process 500 may be performed by validation engine 225. In other implementations, some or all of process 500 may be performed by one or more other devices in addition to, or in lieu of, validation engine 225.

As shown, process 500 may include registering (at 505) toll-free content. For example, as described above, validation engine 225 may register content as toll-free content, based on information provided by content provider 230. For example, validation engine 225 may receive URLs and/or other location information identifying content which is desired to be provided as toll-free content. As part of the registration, validation engine 225 may also receive other parameters, such as charging or account information associated with content provider 230, limits regarding how many times the content may be provided as toll-free content, times (e.g., time of day, day of week, specific days and/or times, etc.) during which the content should be provided as toll-free content, etc.

Process 500 may also include generating, storing, and outputting (at 510) a content key associated with the registered content. For example, validation engine 225 may generate a unique key (using a random key generator, selecting the key from a pool of keys, and/or any other suitable technique for generating a key) for the registered content, and may provide the key to content provider 230. Validation engine 225 may also store the key for later use (e.g., for subsequently validating the content as toll-free). Specifically, for instance, validation engine 225 may store the content key in a manner that indicates with which URL(s) the content key is associated.

Process 500 may additionally include receiving (at 515) a validation request, which may include a content key-URL pair. The validation request may be received, for example, from a particular user device 205, which has received a content page, from content provider 230, which includes the content key and a link to the URL. As mentioned above, the validation request may be outputted by user device 205 based on user device 205 executing a script included in (or linked to by) the content page.

Process 500 may further include validating (at 520) the content key-URL pair. For example, validation engine 225 may determine whether the content key matches the URL (e.g., as previously stored at block 510). In some situations, validation engine 225 may receive multiple content key-URL pairs from user device 205, and may perform the validation (at 520) on each one of the multiple content key-URL pairs. The validating may also include evaluating other parameters, such as whether a time, at which the request is received, falls within a time specified, by content provider 230, during which the content should be provided as toll-free content (e.g., whether the toll-free nature of the content has "expired"). As another example, validation engine 225 may evaluate whether a quantity of times user device 205 has accessed the content in a toll-free fashion exceeds a limit specified by content provider 230. As yet another example, validation engine 225 may evaluate whether the amount of data, transmitted in a toll-free fashion on behalf of content provider 230, exceeds a threshold amount of data associated with content provider 230.

Some of the information, based on which validation engine 225 performs the validating, may be collected and/or provided by charging engine 215. For instance, as mentioned above, charging engine 215 may track how much data has been transmitted, in a toll-free fashion, on behalf of content provider 230, and may provide this information to validation engine 225. As another example, charging engine 215 may track how many times user device 205 has accessed particular content, and may provide this information to validation engine 225.

If the content key-URL pair is valid (520—YES), then process 500 may include generating (at 525) one or more new URLs for the toll-free content. For example, the generating may include modifying an original URL in one or more ways. For instance, validation engine 225 may insert a port number into the URL. Referring to the example discussed above with respect to FIG. 4, the example URL "foo.com:1234/bar.html" may be generated by validation engine 225, based on the original example URL "foo.com/bar.html". In some implementations, validation engine 225 may additionally, or alternatively, insert one or more query strings. For example, the URL "foo.com/bar.html?param1=abc" may be generated based on the original example URL "foo.com/bar.html". The query strings may be used to indicate parameters, such as an expiration time and/or date of the toll-free content, and/or other types of parameters. The parameters may, in some implementations, be determined based on information collected during registration (at 505).

Process 500 may further include outputting (at 530) the generated URL(s). For example, validation engine 225 may output the generated URL(s) to user device 205. As mentioned above, user device 205 (e.g., a script running on user device 205) may replace or supplement the original URLs with the URLs received from validation engine 225.

Process 500 may additionally include notifying (at 535) a charging engine regarding the toll-free content. For example, validation engine 225 may notify charging engine 215 that validation engine 225 has validated content as toll-free for user device 205. Charging engine 215 may, in some implementations, use this notification as part of a charging process for content provider 230. For example, charging engine 215 may determine that content provider 230 should be charged if the linked content is provided to user device 205 within a particular duration of time after the generated URLs are provided (at 530) to user device 205. As another example, charging engine 215 may determine that content provider 230 should be charged each time the generated URLs are provided (at 530) to user device 205. In practice, charging engine 215 may use this notification in other ways, to charge content provider 230. In some implementations, validation engine 225 may forgo notifying (at 535) charging engine 215 regarding the toll-free content.

If, on the other hand, the content key-URL pair is not valid (520—NO), then process 500 may include outputting (at 540) a notification that the content is not toll-free content. For example, validation engine 225 may notify user device 205 that the content is not toll-free content, and user device 205 may forgo displaying a pre-notification regarding the content.

Figure 6:
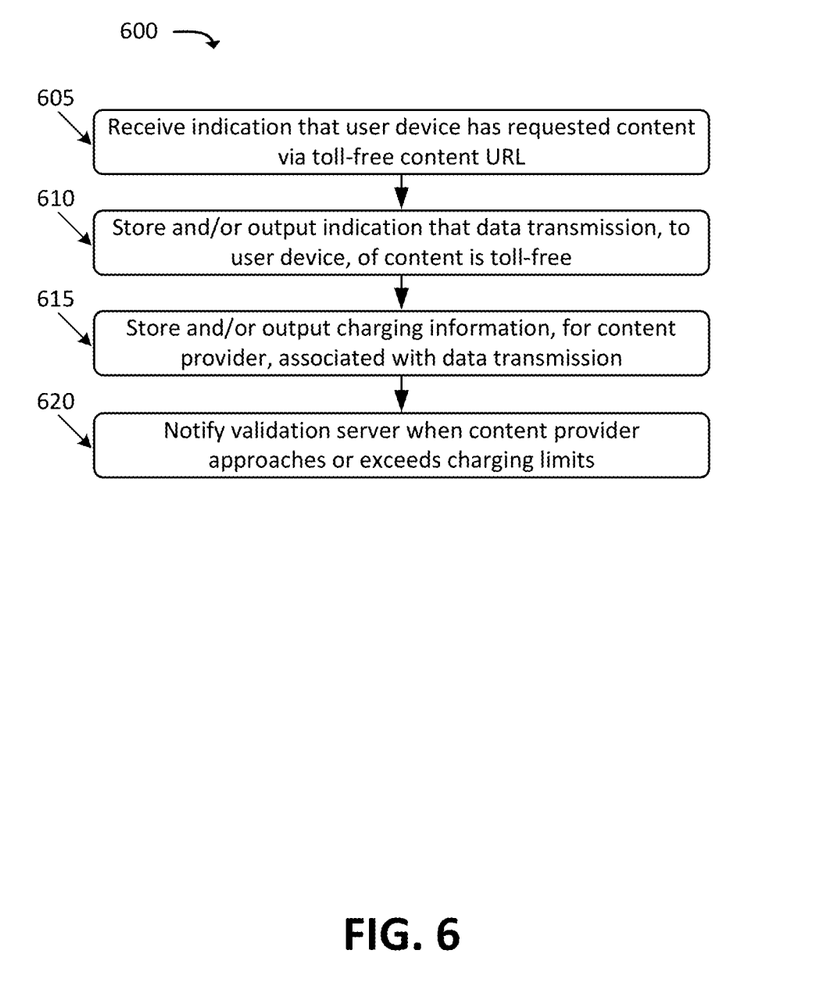
FIG. 6 illustrates an example process of forgoing charging a user for data transmission of toll-free content, and/or for charging a content provider for the data transmission.

FIG. 6 illustrates a flowchart of an example process 600 of forgoing charging a user for data transmission of toll-free content, and/or for charging a content provider for the data transmission. In some implementations, process 600 may be performed by charging engine 215. In other implementations, some or all of process 600 may be performed by one or more devices in addition to, or in lieu of, charging engine 215.

As shown, process 600 may include receiving (at 605) an indication that a user device has requested content via a toll-free content URL. For example, charging engine 215 may receive a notification from a device within wireless network 210 (e.g., a PGW and/or another device that receives traffic from user device 205) that user device 205 has requested toll-free content. For instance, the device within wireless network 210 may "listen" for URLs that are directed to a particular port (e.g., port 1234, in the examples provided above), and notify charging engine 215 regarding requests from user devices 205 that are directed to the particular port. In some implementations, charging engine 215 may, itself, be a device that receives traffic from user device 205 and "listens" for URLs that are directed to a particular port.

Process 600 may also include storing and/or outputting (at 610) an indication that transmission of the data, to the user device, is toll-free. For example, charging engine 215 may store information indicating that a subscriber, associated with user device 205, should not be billed for data usage associated with receiving the content. Additionally, or alternatively, charging engine 215 may notify one or more other devices or wireless network 210 indicating that the subscriber, associated with user device 205, should not be billed for data usage associated with receiving the content. This may be reflected, for example, in the subscriber's monthly billing statement, which indicates how much data has been used by the subscriber.

Process 600 may additionally include storing and/or outputting (at 615) charging information, for the content provider, associated with the data transmission. For example, charging engine 215 may track how much data is used to transmit the content, via wireless network 210, to user device 205. Charging engine 215 may use this information to charge content provider 230 for the data usage (e.g., to bill content provider 230 for the data usage, and/or to count the data usage against an allotted amount associated with content provider 230). In some implementations, content provider 230 may output the information, regarding the data usage, to validation engine 225.

Process 600 may further include notifying (at 620) a validation server when the content provider approaches or exceeds charging limits. For example, when the data usage approaches (e.g., reaches 10%, 5%, or another proportion) of a maximum allotment of data usage associated with content provider 230, or exceeds the maximum allotment, charging engine 215 may notify validation engine 225. Additionally, or alternatively, validation engine 225 may track how much data usage, out of an allotted amount of data usage, has been used by content provider 230 (e.g., based on information provided at 615 by charging engine 215). Validation engine 225 may use this information when validating whether content should be provided in a toll-free fashion.

Figure 7A:
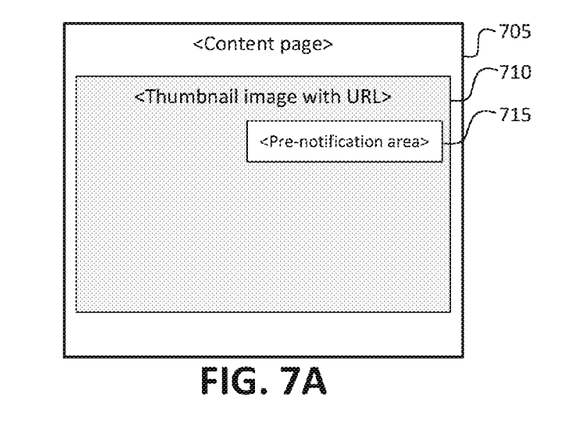
FIG. 7A illustrates an example content page specification, in which a pre-notification display area, regarding toll-free content, is provided.

FIG. 7A illustrates an example content page specification 705, in which a pre-notification display area, regarding toll-free content, is provided. FIG. 7A conceptually represents, for example, a "design-time" content page specification 705 (e.g., at the time that content page 705 is designed, before the page is loaded by user device 205). Content page specification 705 may be a conceptual representation of, for example, an HTML file. As shown, content page 705 may include thumbnail image 710, which may include a link to a particular URL that corresponds to registered toll-free content. Content page specification 705 may also include pre-notification area 715, which may be specified by, for example, CSS information.

Figure 7B:
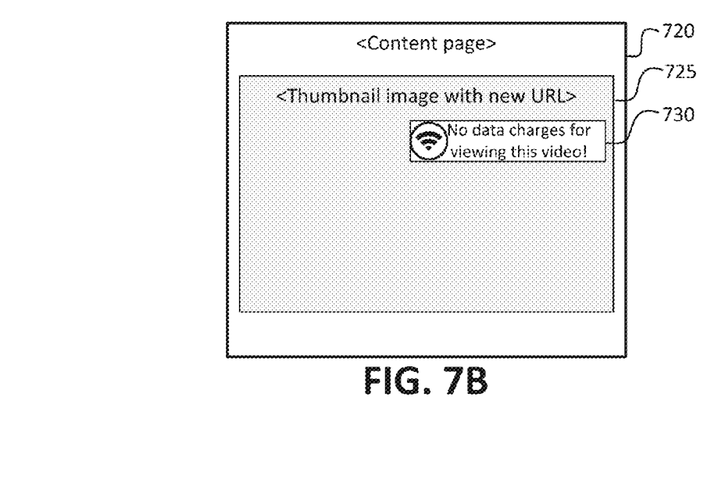
FIG. 7B illustrates an example content page generated based on the content page specification, shown in 7A, in which the toll-free content has been validated.

FIG. 7B illustrates an example content page generated based on the content page specification, shown in 7A, in which the toll-free content has been validated. For example, content page 720 may be a "run-time" content page that is generated (based on content page specification 705) and displayed by user device 205. For instance, content page 720 may be displayed in a web browser application running on user device 205. Content page 720 may be displayed after user device 205 receives information (e.g., from validation engine 225) that the content, linked to by thumbnail image 725, is valid toll-free content. Based on content page specification 705 (e.g., based on CSS information), and further based on receiving validation from validation engine 225, content page 720 may include pre-notification 730 in pre-notification display area 715. As discussed above, the URL, associated with thumbnail 725, may be a modified version of the URL associated with thumbnail 710.

In some implementations, thumbnail image 725 may remain associated with an original URL (e.g., the same URL associated with thumbnail image 710), and the modified URL may be provided as a link associated with pre-notification 730. For instance, if a user selects thumbnail image 725, the original link may be followed, while if a user selects pre-notification 730, the modified link may be followed.

Figure 7C:
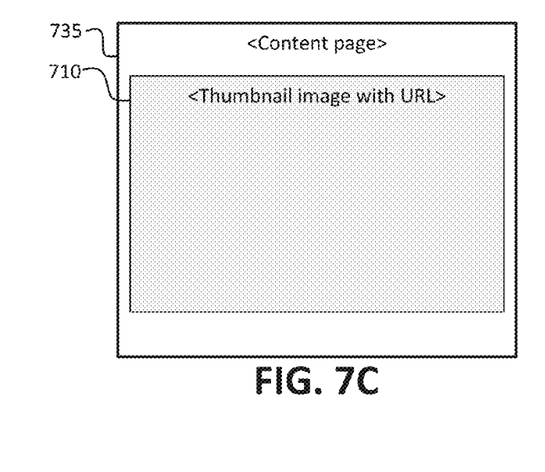
FIG. 7C illustrates an example content page generated based on the content page specification, shown in 7A, in which the toll-free content has not been validated.

FIG. 7C illustrates an example content page generated based on the content page specification, shown in 7A, in which the toll-free content has not been validated. For instance, content page 735 may correspond to a "run-time" implementation of content page specification 705, in situations where the linked content, associated with thumbnail image 710, has not been validated as toll-free content. As shown, content page 735 may not include a pre-notification. In alternate implementations, a notification may be shown, in pre-notification area 715, that the content is not toll-free.

Figure 8A:
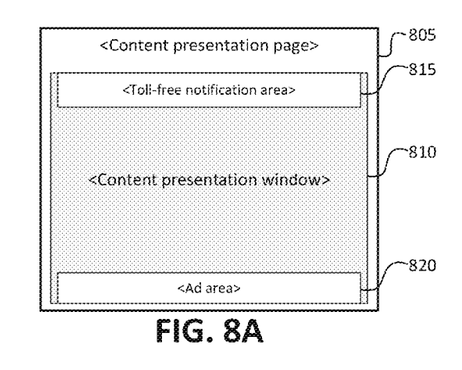
FIG. 8A illustrates an example content presentation page specification, in which display areas may be provided for an indication that content is being presented without data charges (e.g., "toll-free"), and/or a display area for ads (which may also be presented toll-free)

FIG. 8A illustrates an example content presentation page specification 805, in which display areas may be provided for an indication that content is being presented without data charges (e.g., toll-free), and/or a display area for ads (which may also be presented toll-free). FIG. 8A conceptually represents, for example, a "design-time" content presentation page specification 805 (e.g., at the time that content page 805 is designed, before the page is loaded by user device 205).). Content presentation page specification 805 may be a conceptual representation of, for example, an HTML file. As shown, content presentation page specification 805 may include content presentation window 810, toll-free notification area 815, and ad area 820. Content presentation page specification page 805 may correspond to a web page that is designed to be displayed when a user selects a link to content (e.g., a link to toll-free content).

Content presentation window 810 may be, or include, a display area in which content (e.g., streaming video content) is displayed. Toll-free notification area 815 may include a display area in which notifications can be displayed that content is being provided in a toll-free manner. Ad area 820 may include a display area in which advertisements (e.g., banner advertisements) can be provided. Toll-free notification area 815 and ad area 820 may be specified by, for example, CSS information.

Figure 8B:
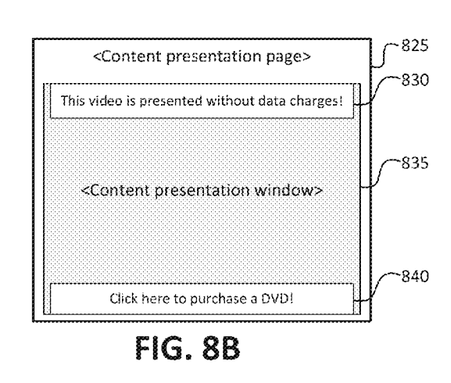
FIG. 8B illustrates an example content presentation page generated based on the content presentation page specification, shown in 8A, in which the toll-free content has been validated.

FIG. 8B illustrates an example content presentation page 825, which may be generated based on content presentation page specification 805, shown in 8A, when toll-free content has been validated. For example, content presentation page 825 may be a "run-time" content page that is generated (based on content presentation page specification 805) and displayed by user device 205. For instance, content presentation page 825 may be displayed in a web browser application running on user device 205. Content presentation page 825 may be displayed after user device 205 receives information (e.g., from validation engine 225) that a URL, associated with content presentation pare 825, includes valid toll-free content. Based on content presentation page specification 805 (e.g., based on CSS information), and further based on receiving validation from validation engine 225, content presentation page 825 may include toll-free notification 830 in toll-free notification display area 815. Additionally, or alternatively, content presentation page 825 may include advertising content 840 in ad area 820. In some implementations, advertising content 840 may be provided by content provider 230 (and/or another source), and may also be provided toll-free to user device 205. In some implementations, when content has been validated as toll-free content, content presentation page 825 may omit one or more of toll-free notification and/or advertising content 840.

Figure 8C:
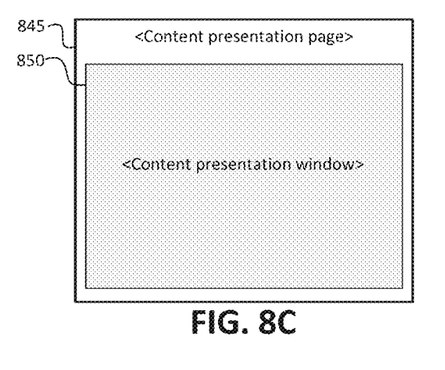
FIG. 8C illustrates an example content presentation page generated based on the content presentation page specification, shown in 8A, in which the toll-free content has not been validated.

FIG. 8C illustrates an example content presentation page 845 generated based on content presentation page specification 805, shown in 8A, when toll-free content has not been validated. For instance, content presentation page 850 may correspond to a "run-time" implementation of content presentation page specification 805, in situations where a URL associated with content presentation page 845, has not been validated as including toll-free content. As shown, content presentation page 845 may not include a toll-free notification and/or advertising content. In alternate implementations, a notification may be shown, in toll-free notification area 845, that the content is not toll-free.

Figure 9:
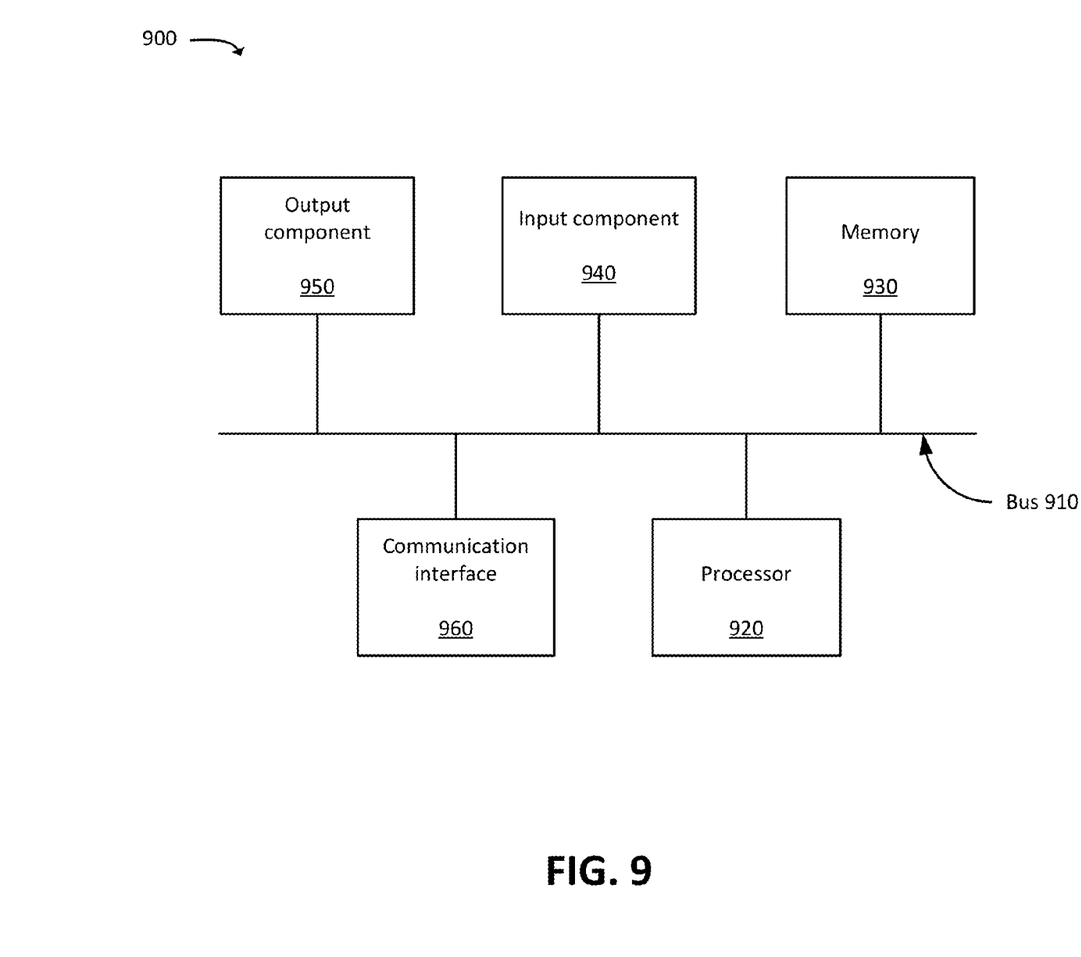
FIG. 9 illustrates example components of a device, in accordance with some implementations described herein.

FIG. 9 is a diagram of example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as one or more cellular radio transceivers, an infrared ("IR") receiver, a Bluetooth® radio transceiver, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 3-6, the order of the blocks and/or signals may be modified in other implementations. Further, non-dependent blocks and/or signals may be performed in parallel.

As another example, while the above description provides examples of toll-free data transmission to user devices, in some implementations, similar concepts may be used to reduce data charges to a non-zero amount. For example, in some implementations, a user may be presented with a link, for which data transmission may only be charged to the user at 50% (or another proportion) of the standard rate.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms), As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A user device, comprising:
   a memory device storing a set of processor-executable instructions; and
   a processor configured to execute the processor-executable instructions, wherein executing the processor-executable instructions causes the user device to:
   receive a web page including one or more links, a particular link being associated with a key, the particular link being a link to toll-free content, the key being associated with the toll-free content;
   output, to a validation server device, a resource identifier associated with the particular link;
   output, to the validation server device, the key associated with the particular link;
   receive, from the validation server device and based on a validation operation performed by the validation server on the resource identifier and the key, a replacement resource identifier that is associated with the toll-free content;
   replace, in the particular link, to generate a modified link, the resource identifier with the replacement resource identifier received from the validation server device;
   present, after replacing the resource identifier with the replacement resource identifier, the web page with the modified link in lieu of the particular link;
   receive a selection of the modified link;
   obtain, based on receiving the selection of the modified link, the toll-free content associated with the replacement resource identifier; and
   present the obtained content associated with the replacement resource identifier.

2. The user device of claim 1, wherein the replacement resource identifier is a modified version of the resource identifier, the modification including a port number being added to the resource identifier.

3. The user device of claim 1, wherein, when the modified link, including the replacement resource identifier, is selected, a user of the user device is not charged for data usage, of a wireless telecommunications network, associated with transmission of the toll-free content linked to by the modified link.

4. The user device of claim 3, wherein, when the modified link, including the replacement resource identifier, is selected, a content provider associated with the toll-free content is charged for data usage, of the wireless telecommunications network, associated with transmission of the toll-free content to the user device.

5. The user device of claim 1, wherein the key is denoted by a HyperText Markup Language ("HTML") "class" tag associated with the link.

6. The user device of claim 1, wherein at least one of the outputting the resource identifier associated with the particular link, the outputting the key, or the replacing are performed by executing JavaScript instructions associated with the web page.

7. The user device of claim 1, wherein the toll-free content, linked to by the particular link, has previously been registered, with the validation server, by a content provider associated with the toll-free content,
   wherein as part of the registering, the validation server provides the key to the content provider,
   wherein the key is included in the web page, by the content provider, after the validation server provides the key to the content provider, and before the web page is received by the user device.

8. The user device of claim 1, wherein executing the processor-executable instructions further causes the user device to:
   display, based on receiving the replacement resource identifier, a notification associated with the modified link.

9. The user device of claim 1, wherein at least one of the resource identifier or the replacement resource identifier include at least one of:
   a Uniform Resource Locator ("URL"),
   a Uniform Resource Identifier ("URI"), or
   an Internet Protocol ("IP") address.

10. The user device of claim 1, wherein the replacement resource identifier, associated with the toll-free content, is received by the user device based on the validation server device validating that the resource identifier and the key are associated with the toll-free content.

11. A system, comprising:
    a memory device storing a set of processor-executable instructions; and
    a processor configured to execute the processor-executable instructions, wherein executing the processor-executable instructions causes the system to:
    register a resource identifier associated with content, the registering including generating or selecting a key associated with the content;
    output the key to a content provider associated with the content;
    receive a validation request from a user device, the validation request including:
      the resource identifier, wherein the resource identifier is associated with a first link presented in a web page that was received by the user device, and
      the key;
    validate the resource identifier and the key included in the validation request;
    generate a replacement resource identifier based on the validating;
    output, to the user device, the replacement resource identifier, wherein outputting the replacement resource identifier causes the user device to present the web page with a second link, associated with the replacement resource identifier, in lieu of the first link;

receive an indication that the user device has selected the second link associated with the replacement resource identifier; and cause, based on the indication that user device has selected the second link associated with the replacement resource identifier, a wireless telecommunications network, via which content associated with the replacement identifier is transmitted to the user device, to:
  forgo charging a user of the user device for the transmission, via the telecommunications network, of the content to the user device, and
  charge the content provider for the transmission, via the telecommunications network, of the content to the user device.

12. The system of claim 11, wherein the replacement resource identifier is a modified version of the resource identifier, the modification including a port number being added to the resource identifier.

13. The system of claim 11, wherein the registering further includes receiving information regarding a temporal restriction on when the replacement resource identifier can be provided,
  wherein the validating further includes determining whether the temporal restriction is met.

14. The system of claim 11, wherein the registering further includes receiving information regarding a limit of an amount of data usage associated with the content provider,
  wherein the validating further includes determining whether the amount of data usage, associated with the content provider, exceeds the limit.

15. The system of claim 11, wherein executing the processor-executable instructions to validate the resource identifier and the key includes determining that the resource identifier and the key are associated with toll-free content.

16. A method, comprising:
  receiving, by a user device, a web page that includes a link to toll-free content, for which data usage associated with receiving the toll-free content, via a wireless telecommunications network, is not charged to an account associated with the user device;
  receiving, by the user device, validation that the link is a link to toll-free content;
  modifying, by the user device and based on receiving the validation, the link;
  presenting, via a display device associated with a user device, the web page, the web page further including:
    the modified link, in lieu of the link, and
    a thumbnail image associated with the modified link;
  generating, by the user device, a visual notification based on receiving the validation;
  overlaying, by the user device, the visual notification over the thumbnail image;
  receiving, by the user device, a selection of the modified link; and
  receiving, by the user device and via the wireless telecommunications network, the toll-free content associated with the modified link.

17. The method of claim 16, wherein the link is associated with a key, the method further comprising:
  outputting, to a validation server:
    a resource identifier, associated with the link, and
    the key,
  wherein the validation server validates the link as being associated with toll-free content based on the resource identifier and the key.

18. The method of claim 16, further comprising:
  presenting the toll-free content, the presenting including presenting a visual indication that the toll-free content is being provided to the user without the user being charged for data usage, of the wireless telecommunications network, associated with receiving the toll-free content.

19. The method of claim 16, wherein the link includes a Uniform Resource Locator ("URL") that does not specify a port number, and wherein the modified link includes a URL that specifies a port number.

20. The method of claim 19, wherein the port number is used by the wireless telecommunications network to identify the replacement link as being a link to toll-free content.

* * * * *